T. S. DISSTON.
INSERTABLE SAW-TEETH.
No. 178,123.  Patented May 30, 1876.
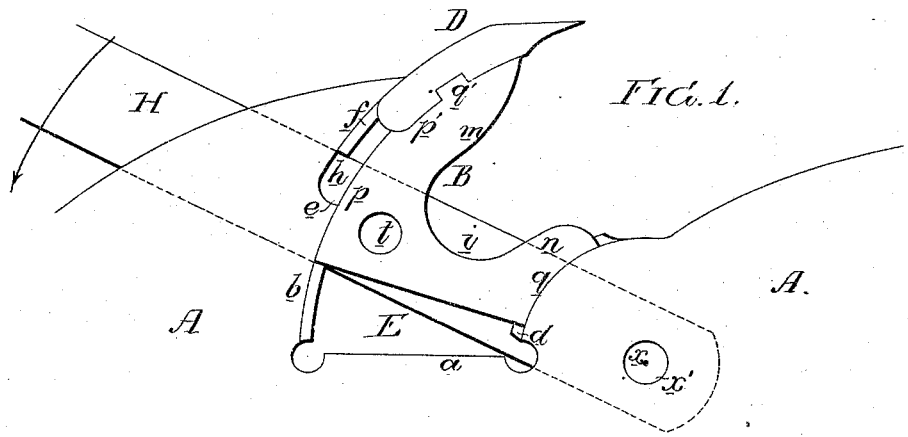
FIG. 1.
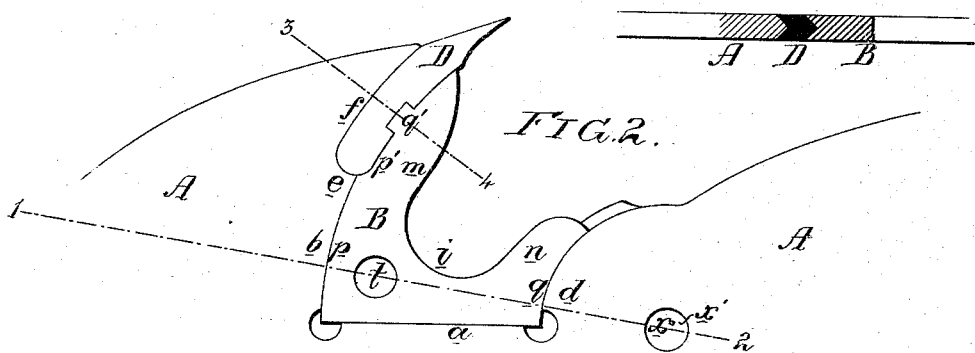
FIG. 2.
FIG. 4.
FIG. 3.
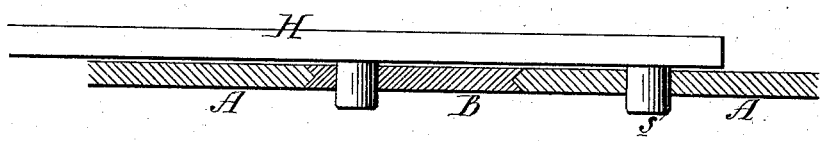
Witnesses
Harry Howson Jr
Harry Smith
Thomas S. Disston
by his Attorneys
Howson and Son

UNITED STATES PATENT OFFICE.

THOMAS S. DISSTON, OF PHILADELPHIA, PENNSYLVANIA.

IMPROVEMENT IN INSERTIBLE SAW-TEETH.

Specification forming part of Letters Patent No. 178,123, dated May 30, 1876; application filed January 5, 1876.

*To all whom it may concern:*

Be it known that I, THOMAS S. DISSTON, of Philadelphia, Pennsylvania, have invented an Improvement in Insertible Saw-Teeth, of which the following is a specification:

The main object of my invention is to so lock detachable teeth to the blade of a saw that the truth of the latter will not be affected either by the introduction of the teeth, or by heat imparted to the same when the saw is in operation.

This object I attain in the manner which I will now proceed to describe, reference being had to the accompanying drawing, in which—

Figures 1 and 2 are side views, representing my invention; Fig. 3, a section on the line 1 2, and Fig. 4 a section on the line 3 4.

A represents part of the blade of a circular saw; D, the tooth, and B the locking-plate, which is adapted to a recess, E, cut in the blade. The bottom $a$ of this recess is straight, as shown, and the two V-shaped edges $b$ and $d$ are made on circular lines having a common center at the point $x$. In the edge $b$ of the recess E there is a sub-recess, $h$, extending from the point $e$ to the outer edge of the blade, the edge $f$ of this sub-recess being V-shaped, and made on a circular line, of which the same point $x$ is the center. In the locking-plate B is made a deep throat, $i$, so as to leave two projecting arms, $m$ and $n$, the grooved edges $p$ and $q$ of plate being made to coincide with, and fit snugly to, the V-shaped edges $b$ and $d$ of the recess E. The arm $m$ of the locking-plate has a recess, $p'$, and between the latter and the edge $f$ of the recess $h$ in the blade (when the locking-plate is in place, as in Fig. 2) there is a space for receiving the body of the tooth D, which is retained in place by a key, $q'$, on the projection $m$.

The locking plate and tooth are introduced to their places by a lever, H, the fulcrum-pin $s$ of which is inserted in a hole, $x'$, made in the blade or plate, and having as its center the point $x$, another pin on the lever being introduced into a hole, $t$, in the locking-plate. On depressing the outer end of the lever in the direction pointed out by the arrow in Fig. 1, the locking-plate and tooth will be brought to their places, as shown in Fig. 2, the straight lower edge of the plate bearing on the straight bottom of the recess E.

The greatest objection to insertible teeth is the tendency which they have to distort the blade of the saw. This is brought about, partly, by so driving or forcing the teeth into their places that the edge of the saw will be expanded, and partly by the heat imparted to the teeth when the saw is in operation, this heat tending to expand the teeth and stretch the blade at or near the edge.

It should be understood that, although the locking-plate and tooth fit accurately to their places, and with sufficient tightness to prevent displacement, no such force is required to introduce them as can affect the integrity of the blade.

Heat generated by friction will be first imparted to the tooth D and to the projection $m$ of the locking-plate, and, owing to the throat $i$, this projection will yield to the expansion caused by heat, which cannot, therefore, injuriously affect the blade.

Owing to the concentricity of the edges $b$, $d$, and $f$ of the recess E all these edges may be milled at one operation, the center of vibration of the milling-tool being at the point $x$. The edges of a number of the locking-plates B may also be milled simultaneously by securing the plates in a circle on the face-plate of the lathe, and cutting the V-shaped grooves in their edges by means of a suitable tool.

I claim as my invention—

The combination of the blade A and its segmental recess E, having edges $b$, $d$, and $f$ made on circular lines having a common center at a point, $x$, in the blade, with the locking-plate B and tooth D adapted to the said recess E, all substantially as set forth.

In testimony whereof I have signed my name to this specification in the presence of two subscribing witnesses.

THOS. S. DISSTON.

Witnesses:
HARRY HOWSON, Jr.,
HARRY SMITH.